United States Patent
Kupratis (10) Patent No.: US 7,513,120 B2
(45) Date of Patent: Apr. 7, 2009

(54) ELECTRICALLY COUPLED SUPERCHARGER FOR A GAS TURBINE ENGINE

(75) Inventor: Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 684 days.

(21) Appl. No.: 11/101,527

(22) Filed: Apr. 8, 2005

(65) Prior Publication Data
US 2006/0225431 A1 Oct. 12, 2006

(51) Int. Cl.
*F02C 3/10* (2006.01)
*F02C 6/00* (2006.01)

(52) U.S. Cl. .......................... 60/791; 60/788; 60/39.24

(58) Field of Classification Search ............ 60/787, 60/788, 39.15, 791, 792, 39.163, 39.21, 39.24
See application file for complete search history.

(56) References Cited

U.S. PATENT DOCUMENTS

| | | | | |
|---|---|---|---|---|
| 3,585,795 A | * | 6/1971 | Grieb | 60/39.163 |
| 3,686,860 A | * | 8/1972 | White | 60/39.25 |
| 4,041,696 A | * | 8/1977 | Morrison | 60/790 |
| 4,064,690 A | * | 12/1977 | Kronogard | 60/792 |
| 4,423,593 A | * | 1/1984 | Zagranski et al. | 60/791 |
| 5,133,182 A | * | 7/1992 | Marcos | 60/792 |
| 5,553,448 A | * | 9/1996 | Farrell et al. | 60/792 |
| 5,694,765 A | * | 12/1997 | Hield et al. | 60/39.163 |
| 6,735,951 B2 | * | 5/2004 | Thompson | 60/774 |
| 7,204,090 B2 | * | 4/2007 | O'Connor | 60/778 |
| 7,240,478 B2 | * | 7/2007 | Kopko | 60/39.17 |
| 2003/0126864 A1 | * | 7/2003 | Thompson | 60/788 |
| 2004/0168427 A1 | * | 9/2004 | Truco et al. | 60/226.1 |
| 2005/0056021 A1 | | 3/2005 | Belokon et al. | |
| 2007/0137216 A1 | * | 6/2007 | Joshi et al. | 60/791 |
| 2007/0277532 A1 | * | 12/2007 | Talan | 60/792 |

FOREIGN PATENT DOCUMENTS

JP 2001107750 A 4/2001
JP 2001295669 A 10/2001

* cited by examiner

*Primary Examiner*—William H Rodriguez
(74) *Attorney, Agent, or Firm*—Bachman & LaPointe, P.C.

(57) ABSTRACT

A gas turbine engine, in particular a turboshaft engine, includes a spool having a turbine and a gas generator compressor mounted thereto, a source of heat positioned between the turbine and the compressor, a first shaft and a free turbine mounted to the first shaft, and a control system for transferring power between the spool and the shaft. The operating speed of the gas generator compressor is re-matched in order to improve the efficiency and surge margin of the gas generator compressor and to improve the transient performance of the gas turbine engine.

38 Claims, 6 Drawing Sheets

ELECTRICALLY COUPLED SUPERCHARGER FOR A GAS TURBINE ENGINE

STATEMENT OF GOVERNMENT INTEREST

The Government of the United States of America may have rights in the present invention as a result of Contract No. DAAH10-03-C-0051 awarded by the U.S. Department of the Army.

BACKGROUND OF THE INVENTION (1) Field of the Invention

The present invention is directed to a gas turbine engine, in particular a turboshaft engine, which has particular utility in aircraft engine applications.

(2) Prior Art

Gas turbine engines, such as turboshaft engines, are known in the art. In the past, such engines have suffered mechanical clutching problems that detracted from their performance.

There is a need for a gas turbine engine which eliminates such mechanical clutching problems.

SUMMARY OF THE INVENTION

It is an object of the present invention to provide a gas turbine engine which eliminates mechanical clutching problems.

It is a further object of the present invention to re-match the operating speed of the gas generator compressor of a gas turbine engine in order to improve the efficiency and surge margin of the compressor and to improve the transient performance of the gas turbine engine.

The foregoing objects are attained by the gas turbine engine of the present invention.

In accordance with the present invention, a gas turbine engine having improved transient performance and a gas generator compressor with improved efficiency and surge margin is provided. The gas turbine engine broadly comprises a spool having a turbine and a compressor mounted thereto, a first shaft and a free turbine mounted to the first shaft, and means for transferring power between the spool and the shaft.

Other details of the electrically coupled supercharger for a gas turbine engine, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

Figure 1:
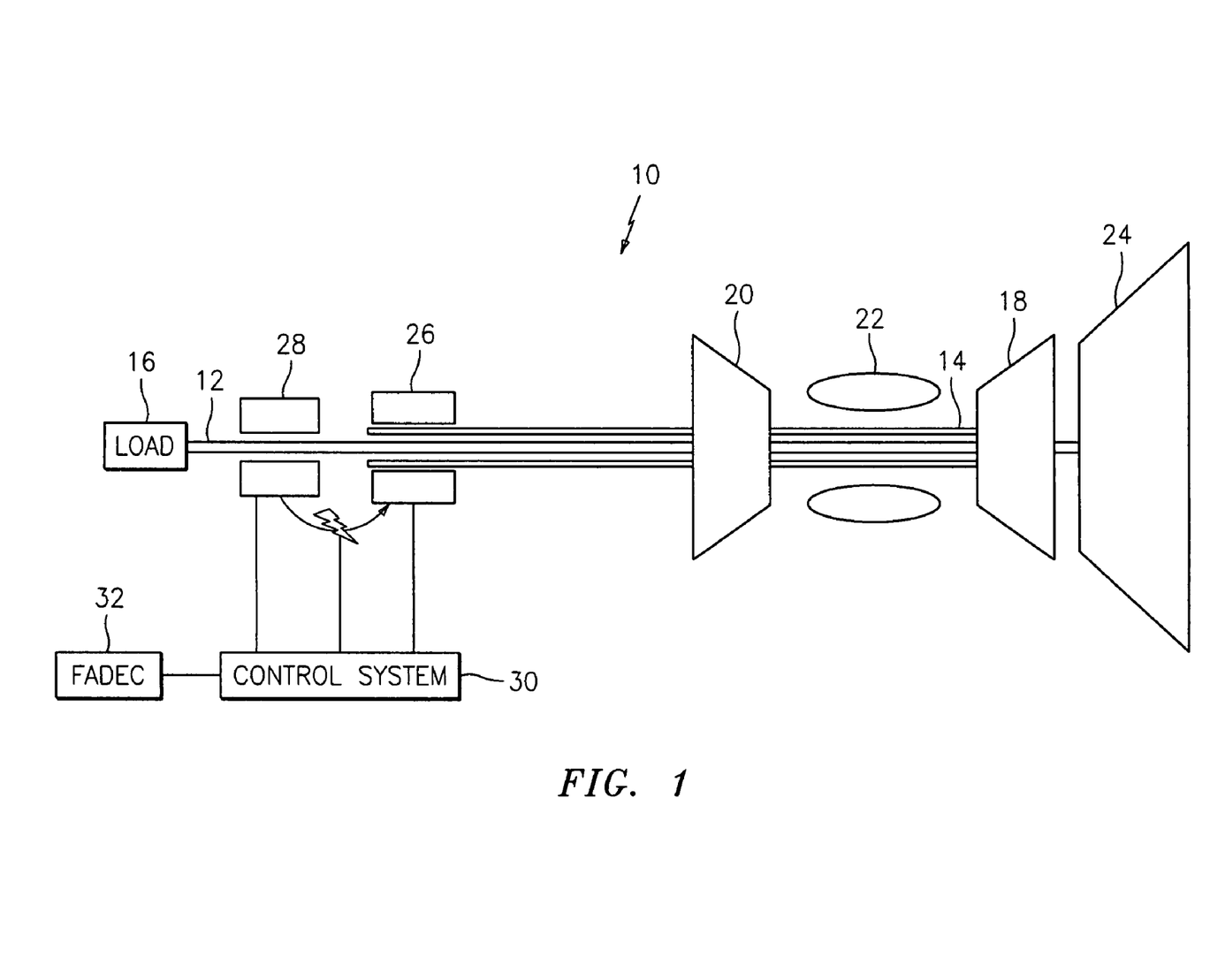
FIG. 1 is a schematic representation of a first embodiment of a gas turbine engine in accordance with the present invention.

Referring now to the drawings, FIG. 1 illustrates a gas turbine engine 10, in particular a turboshaft engine, which can be used in aircraft applications, such as for driving the main rotor of a helicopter. The configuration of the gas turbine engine 10 is a two shaft engine with each shaft 12 and 14 being free to rotate independently from the other and at different speeds. In general, the speeds are significantly different between the shafts 12 and 14, e.g. a factor of 2 or more. The shaft 12 is a power output shaft which may be connected to a load 16. The shaft 14 is actually a spool to which a gas generator turbine 18 and a gas generator compressor 20 are mounted using any suitable means known in the art. If desired, the compressor 20 may be a variable geometry gas generator compressor. Intermediate the compressor 20 and the turbine 18 is a means 22 for heating the gas leaving the compressor 20 to increase the energy of the gas prior to the gas entering the turbine 18. The heating means 22 may comprise any suitable combustor known in the art. Alternatively, the heating means 22 may comprise a nuclear power source or any other suitable device for elevating the temperature of the gas exiting the compressor 20.

A second turbine 24 is mounted to the shaft 12. The second turbine 24 may be termed a free turbine because it does not drive a compressor. The turbine 24 may be mounted to the shaft 12 by any suitable means known in the art.

As can be seen from the foregoing description, there is a turbine that extracts energy from the gas that flows through it mounted to each of the shafts 12 and 14. As the gas passes through each turbine 18 and 24, the pressure and temperature of the gas decreases as energy is extracted by the turbine 18 or 24 and is imparted to the respective shaft 12 or 14. The rate of energy extraction is power. The power extracted by each turbine 18 or 24 is imparted to a respective shaft 12 or 14 as a torque acting on the shaft as it rotates. Power equals torque× speed.

In the engine 10, the higher speed shaft is the spool 14 that drives the compressor 20. Together, the compressor 20 and its driving turbine 18 comprise a gas generator spool. Between the compressor 20 and turbine 18, there is the non-rotating heating means 22. Air is pumped by the compressor 20 to a higher pressure. The air exits the compressor 20 and is heated in the heating means 22, typically by burning a fuel. This adds energy to the air. The mixture of combustion products is called a gas. The hot gas passes through the turbine 18 as previously noted. The gas exiting the turbine 18 still is high enough in temperature and pressure that additional energy can be extracted by the turbine 24 which is located downstream of the turbine 18.

The higher speed shaft 14 can be used to drive a high speed electrical machine 26 that preferably can operate selectably as either a high-speed generator or a high speed motor. As a generator, the machine 26 extracts power from the higher speed shaft 14. This is an additional quantity of power (beyond that required to drive the compressor 20) that is extracted from the turbine 18. As a motor, the electrical machine 26 imparts power to the shaft 14. This acts to reduce the amount of power extracted by the turbine 18 (power needed to drive the compressor 20). The power imparted by the motor 26 helps to drive the compressor 20. The total power required to drive the compressor 20 is the sum of the turbine power and the power imparted by the motor 26.

The lower speed shaft is the power output shaft 12. The shaft 12 may be used to drive a load 16 such as a compressor, a fan, a compressor and a fan, a helicopter rotor, and/or any other mechanical load, including but not limited to, a large electric generator. If a compressor (not shown) is being driven by the shaft 12, then the compressor and the turbine 24 comprise a low pressure/low speed spool and the turbine 24 is no longer a free turbine. If there is a compressor attached to the shaft 12, the compressor pumps the airflow as a supercharger to the gas generator compressor 20. Otherwise, the turbine 24 is a free turbine as previously discussed.

As noted previously, the gas exiting the higher speed turbine 18 still is high enough in temperature and pressure that additional energy can be extracted by the lower speed turbine 24 located downstream. The lower speed shaft 12 also can drive an electrical machine 28 that preferably can operate selectably as either a generator or a motor. As a generator, the electrical machine 28 extracts power from the shaft 12. This is an additional quantity of power that is extracted via the lower speed turbine 24. The power from the electrical machine 28 acting as a generator is available to drive anything else via a motor. Thus, the electric machine 28 acting as a generator can be used to add power that was extracted via the low speed turbine 24 to the gas generator spool 14 when the electrical machine 26 is selected to operate as a motor.

As a low-speed motor, the electrical machine 28 may be used to impart power to the shaft 12. This acts to reduce the amount of power extracted by the low speed turbine 24. The power imparted by the motor 28 may be used to help drive whatever the low speed turbine 24 is driving.

In summary, there is a high speed electrical machine 26 connected to the high-speed shaft 14 of the gas turbine engine 10. The electrical machine 26 has dual functionality: it can function either as a high-speed generator (drawing power from the high-speed shaft 14) or as a high speed motor (imparting power to the high-speed shaft 14). There is a low-speed electrical machine 28 connected to the low-speed shaft 12 of the gas turbine engine 10. The electrical machine 28 also has dual functionality where it can function either as a low-speed generator (drawing power from the low-speed shaft 12) or as a low-speed motor (imparting power to the low-speed shaft).

The following describes possible combinations of electrical machine functionality and power exchanges:

1. Low-speed generator 28 extracts power from the low-speed shaft 12;
2. Low-speed motor 28 imparts power to the low-speed shaft 12;
3. High-speed generator 26 extracts power from the high-speed shaft 14;
4. High-speed motor 26 imparts power to the high-speed shaft 14;
5. Low-speed generator 28 extracts power from the low-speed shaft 12 and the power is transferred to the high-speed motor 26 which imparts the transferred power (net of losses) to the high-speed shaft 14; and
6. High-speed generator 26 extracts power from the high-speed shaft 14 and the power is transferred to the low-speed motor 28, which imparts the transferred power (net of losses) to the low-speed shaft 12.

The power transfer chain for combination #5 is low-speed turbine 24 (power fraction) to low-speed generator 28 to power electronics 31 to high-speed motor 26 to high-speed shaft 14. The power transfer chain for combination #6 is high-speed turbine 18 (power fraction) to high-speed generator 26 to power electronics 31 to low-speed motor 28 to low-speed shaft 12. For each of these chains, there are associated efficiencies.

Each of the electrical machines 26 and 28 can be mounted to a respective one of the shafts 12 and 14 using any suitable means known in the art. Preferably, the electrical machines 26 and 28 are mounted mechanically onto the respective shafts 12 and 14. Alternatively, the electrical machines 26 and 28 could be driven off pads on a gearbox.

Operation of the electrical machines 26 and 28 can be controlled by a control system 30 which in turn is controlled by a full authority digital electronic control (FADEC) 32. The control system 30 may comprise a computer or processor which is programmed in any suitable manner known in the art to control compressor geometry and to control the electrical machines 26 and 28. The control system 30 provides instructions to the electrical machines 26 and 28 to operate as a motor or generator depending upon engine requirements. The power electronics 31 between the electrical machines 26 and 28 are provided to allow electrical power to be transferred from the machine 26 to the machine 28 and vice-versa.

The novelty associated with the use of the electrical machines 26 and 28 is as follows. The shafts 12 and 14 rotate at independent speeds and the respective turbines 24 and 18 are independent of each other mechanically. The turbines 24 and 18 are coupled aero-thermodynamically in that the flow exiting the gas generator turbine 18 feeds the low-speed turbine 24. If the turbine 24 drives a compressor that supercharges the gas generator compressor 20, there is also an aero-thermodynamic coupling between the compressors and the turbines. The turbines 18 and 24 rotate at different speeds. It is the speed of each shaft 12 and 14 that is the variable that achieves the power balance between the power available from the turbine and the power required by the compressor or any other rotating load on each shaft. Also, the inlet temperature of the gas flowing through each turbine 18 and 24 determines the power output of the turbine. The speed of the shaft 14 varies to achieve a balance between the power required to drive the compressor 20 versus the power output of the turbine 18. The higher is the inlet temperature to the turbine 18, the higher is the speed that the shaft 14 rotates. For a given inlet temperature to the turbine 18, the high-speed electrical machine 26 acts to modify, to a different value of speed, the speed that achieves the balance between the power absorbed by the compressor 20 and the power available from the turbine 18. If the electrical machine 26 is in motor mode and power is input to the motor, the shaft 14 rotates faster, resulting in more airflow and higher pressure ratio of the compressor 20, than if there was no power input to the electrical machine 26 acting as a motor. Alternatively, if the high-speed electrical machine 26 is in generator mode and power is extracted from the high-speed shaft 14, the shaft 14 rotates slower, resulting in less airflow and lower pressure ratio of the compressor 20, than if there was no power extraction via the generator. The low-speed shaft system behaves similarly to the high-speed system, but there are some differences. For example, for a low-speed shaft system that drives a helicopter rotor, the speed of the turbine 24 is governed to a constant value.

For a turboshaft engine such as that shown in FIG. 1, specific fuel consumption (SFC) is the fuel flow rate of combustion divided by the output power (from the free turbine/low speed turbine 24) of the engine. SFC is inversely proportional to the thermodynamic efficiency of the engine and the relationship depends on the type of fuel being burned (its lower heating value (LHV)). For LHV=18,400 Btu/lbm, the equation for SFC and engine thermodynamic efficiency is SFC=13.83/Efficiency where efficiency is in percent.

A variable capacity engine ideally maintains a constant compressor pressure ratio, regardless of the inlet temperature to the gas generator turbine. For an ideal gas turbine thermodynamic cycle, the thermodynamic efficiency of the engine increases as the pressure ratio of the compressor increases and vice versa. For a real gas turbine engine, the speed and compressor pressure ratio of the gas generator depends on the inlet temperature to the turbine 18. But the power output of the engine also depends on what is the inlet temperature to the turbine 18. When high power output is required from the engine 10, the turbine inlet temperature is high, the compressor pressure ratio is high, the speed of shaft 14 is high, and the engine operates at maximum efficiency. But when lower power output is required from the engine 10, the turbine inlet temperature is lower, the compressor pressure ratio is lower, the speed of shaft 14 is lower, and the engine operates less efficiently.

For engine 10 and net power output to a helicopter rotor for example, select generator mode for electrical machine 28 and motor mode for electrical machine 26. Extract power from the low-speed shaft 12. Transfer a quantity of power through the power electronics 31 to the electrical machine 26. The results are (a) a higher level of low-speed turbine power and (b) the gas generator rematches to a higher speed, higher flow rate, and higher compressor pressure ratio, but lower inlet temperature to the turbine 18. Thus, the engine of the present invention achieves a variable capacity effect on the engine configuration. This corresponds to an improvement in the thermodynamic efficiency of the engine. In addition, without the power transfer of the present invention, at lower power, the turbine 24 operates less efficiently because it too performs better at higher engine power levels. Under the aforementioned scenario, the turbine 24 produces more power and does so more efficiently and this contributes to an improvement in the thermodynamic efficiency of the engine. Note that by rematching the high-speed compressor 20 to a higher speed and flow rate, the operating line of the compressor is moved away from the surge line of the compressor, and this increases the surge margin of the compressor.

Figure 2:
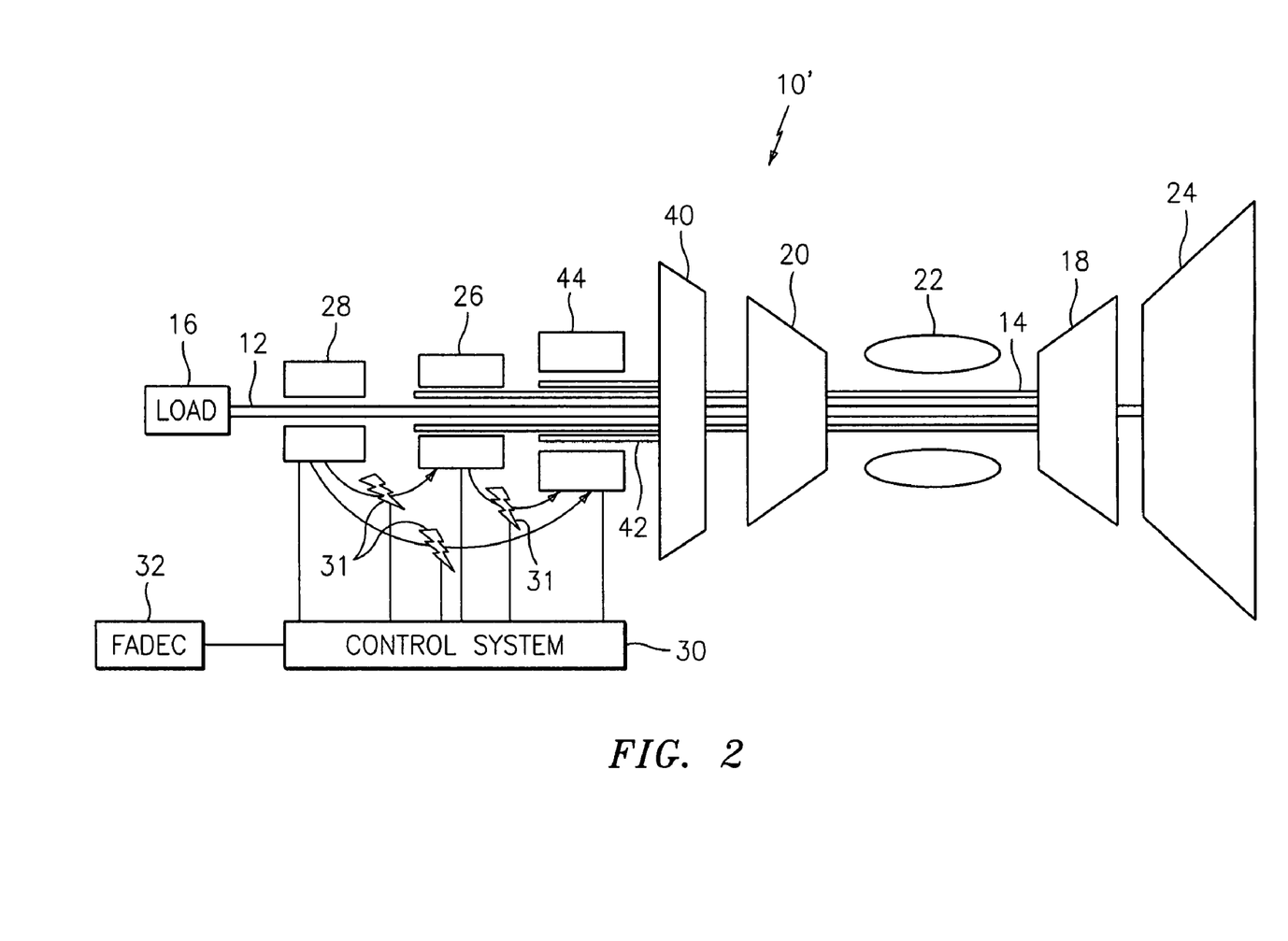
FIG. 2 is a schematic representation of a second embodiment of a gas turbine engine in accordance with the present invention.

Referring now to FIG. 2, there is shown another embodiment of a gas turbine engine 10'. In this embodiment, there is a free compressor 40 mounted to a third shaft 42 by any suitable means known in the art. If desired, the free compressor 40 may be a variable geometry compressor. Also, mounted to the shaft 42 is a third electrical machine 44. The machine 44 may selectably operate as a motor or as a generator. The machine 44 is controlled by the control system 30 and may be electrically connected to both of the electrical machines 26 and 28 by power electronics 31 so that electrical power can be transferred from the machine 44 to either, or both, of the machines 26 and 28 and electrical power from one, or both, of the machines 26 and 28 may be transferred to the machine 44. The free compressor 40 has no turbine attached to it and may be used to supercharge the high speed compressor 20.

As can be seen from FIG. 2, the free compressor 40 is preferably positioned upstream of the compressor 20 and supercharges it. When the electrical machine 44 is operated as a motor, the electrical machine 44 drives the compressor 40. The free compressor 40 rotates at a speed that is different from, and is independent of, the speeds of both the gas generator compressor 20 and the free turbine 24. Similar to usage of a supercharger to increase the power and to improve the thermodynamic performance of a diesel engine, the free compressor 40 has a similar effect on the engine 10'. At lower engine power levels, the free compressor 40 increases the overall pressure ratio of the gas turbine engine 10' and improves engine efficiency. The power required to drive the free compressor 40 can be obtained in three ways: (1) use the high-speed electrical machine 26 as a generator to extract power from the gas generator spool 14, or (2) use the low-speed electrical machine 28 as a generator to extract power from the free turbine 24, or (3) use both options 1 and 2 together. The free compressor 40 has the advantage that the amount of supercharging firstly can be none at all or it can be infinitely variable within the pressure ratio capability of the supercharger. By changing the amount of power input to the free compressor 40, the pressure ratio of the supercharging can be varied in order to best operate the engine 10' at different levels of required engine power. The capability to supercharge the gas generator also increases the power that the engine 10' can produce at high altitudes, where the air density is lower than at sea level. As an engine is flown higher in altitude, the ambient air temperature decreases. This causes the compressor 20 to match at higher referred speeds and eventually the compressor 20 reaches a flow intake limit. Supercharging, especially via a free supercharger, increases compressor flow intake.

The ability to modify the speeds of both the high speed shaft 14 and the low-speed shaft 12 during operation of the gas turbine engines of the present invention enables a new strategy for engine design. The engines of the present invention can reduce the redline speeds of the shafts 12 and 14. Since the engines of the present invention can change the power load on the high-speed turbine 18 (by extracting power via the high-speed generator), the inlet temperature to the low-speed turbine 24 can be reduced, which can be advantageous, for example, by avoiding the need to use a higher temperature material in the low-speed turbine 24 or by avoiding the need to cool the low-speed turbine 24.

One of the particular advantages to the engine designs of the present invention is that mechanical clutches are eliminated.

The following discussion embellishes the discussion above about increased surge margin of the compressor 20 and further discusses the benefits of the present invention during transient operation of the engine, i.e. throttle maneuvers. Note that the power that is provided to the high speed shaft 14 by the electric machine 26 is obtained from the low speed electrical machine 28 on the shaft 12 with the low speed machine 28 acting as a generator.

The power output of the engine 10 or 10' (via the turbine 24) depends on the inlet temperature to the high speed turbine 18. The higher is the inlet temperature to the turbine 18, the higher is the power output of the engine. The higher is the inlet temperature to the turbine 18, the more power that is extracted by the turbine 18. In a corresponding manner, the higher is the inlet temperature to the turbine 18, the higher is the inlet temperature to the turbine 24. Therefore, at higher inlet temperatures to both turbines 18 and 24, more power is extracted by each of the turbines. Since the power output of the engine can be varied by varying the inlet temperature to the high speed turbine 18 (by burning more or less fuel in the heating means 22 upstream of the turbine 18), the amount of power that is extracted by each of the turbines depends on the inlet temperature to each turbine. The power that is available from the turbine 18 to drive the compressor 20 is proportional to the power output of the engine. At low engine power output levels, the power of the turbine 18 is also lower. However, if the electrical machine 26 is in motor mode, the quantity of power that the electrical machine 26 can impart to the shaft 14 is nearly constant. The capability of the electrical machine 26 to impart power to the shaft 14 has some dependency on the speed of the shaft 14, however this can be compensated by varying the frequency of the motor's electromagnetic field. This requires the control system 30 to control the electrical machine 28 and its field variation in order to maintain a constant power input to the shaft 14 by the electrical machine 26. When the power input by the electrical machine 26 to the shaft 14 is constant regardless of engine power or the speed of the shaft 14, the impact of the power input by the electrical machine 26 is more and more as engine power output is lower and lower. The total power input to the shaft 14 is the sum of the power input by the turbine 18 and the electric machine 26. The fraction of power added to the high speed shaft 14 by the electrical machine 26 is larger and larger as the engine power output is smaller and smaller. Thus, by imparting a constant power to the shaft 14, the electrical machine 26 acting as a motor has a greater and greater effect on the operation of the compressor 20 at low engine power, which also means lower speed of the compressor 20, lower pressure ratio and lower flow rate. At low engine power, the electric machine 26 acting as a motor causes the compressor 20 to increase in flow more so than at high engine power. The operating line of the compressor 20 is shifted further away from the surge line at lower and lower compressor speed/flow/pressure ratio. Compared to an engine operating at the same level of engine power output but not having the boosting power applied by the electrical machine 26 acting as a high speed motor, the engine designs of the present invention operate the compressor 20 at higher flow rate, higher speed, higher pressure ratio, but the high speed turbine inlet temperature is lower. This is because more engine power is produced by more airflow, so temperature decreases to match the required power output for the engine. This is a big advantage for transient operation of the engine. If one supposes the engine 10 or 10' is at a low power level, then there is a demand for maximum engine power. The fuel flow rate into the heating means 22 is increased rapidly. However, if the fuel flow is ramped up too aggressively, the inlet temperature to the turbine 18 will spike and this results in an overtemping of the turbine 18. The engine designs of the present invention have an advantage because they begin the transient at a lower turbine inlet temperature. For the same fuel flow rate ramp as a conventional engine, the engine designs of the present invention are less likely to overshoot the inlet temperature to the turbine 18. The transient temperature swing to achieve a change in power from low power to high power is approximately the same between a conventional engine and the present invention. Since the engine designs of the present invention begin the transient at a lower temperature, peak temperature during the transient is a lower temperature. Thus, there is a reduction in the transient peak temperature of the engine 10 or 10' because it begins the transient at a lower temperature. The engine designs of the present invention also begin the transient at a higher speed of the high speed shaft/higher speed of the compressor 20. Accelerating an engine from low power to maximum power requires the high speed shaft 14 to be accelerated from low speed to max power speed. The physics of the transient require a rotational kinetic energy change from low speed to high speed, i.e. maximum power. The kinetic energy change is calculated as difference between the square of the speed at the end of the transient and the square of the speed at the beginning of the transient. Thus, to achieve the same acceleration of the high speed shaft 14 (same speed at max operating power), the engines of the present invention require a smaller change in rotational kinetic energy. For the same rate of ramp up in fuel versus time, the engines of the present invention are accelerated more quickly to maximum power.

Note, there is no overshoot in high spool speed. Since the engines of the present invention have more surge margin and accelerate the engine quicker, it is possible to cash-in on some of the surge margin advantage during the first phase of the transient: use a more aggressive fuel flow ramp, but one that has the same resulting peak inlet temperature to the high turbine as for a conventional engine. Usage of the more aggressive fuel flow ramp results in an even faster acceleration of the engine up to maximum power level and does so within the same surge margin constraints as the conventional engine. The ability to accelerate the gas generator compressor 20 more quickly to maximum power level is highly desirable.

Suppose there is active intervention during an acceleration transient. Specifically consider the problem for a helicopter when the engine is operating at low power level and there is a sudden demand for the engine to accelerate to maximum power. The demand to accelerate to maximum power is the result of the pilot changing the power requirement of the helicopter main rotor so that it produces more lift. In order to maintain the higher level of lift now demanded by the pilot and the rotor, the engine must accelerate to produce the output power that matches the power required to produce/maintain the lift. Helicopter rotors are operated so that the rotor speed is maintained within a small band of variation about 100% speed. For safe operation of the helicopter, the droop in main rotor speed must be limited to about 1%. With the engines of the present invention, it is possible to take advantage, transiently, of the additional surge margin made possible by the boost provided by the electrical machine 26 acting as a high speed motor, by briefly switching it off and by adding a power extraction (generator load) to the high speed shaft 14 by using the high-speed electrical machine 26 as a high speed generator. The engines of the present invention also have a low-speed electrical machine 28 on the low speed shaft 12 that drives the helicopter main rotor. The low speed turbine 24 drives the low speed shaft 12. At an optimum point during the transient (comprised of sudden load demand and sudden acceleration of the gas generator to provide more engine power), it is possible to orchestrate a mirror image switching of the loads of the high speed electrical machine 26 and the low speed electrical machine 28 to provide a power boost to the helicopter main rotor, so that rotor droop is mitigated and controlled and even shorter in the duration of its own transient. The scenario is the following, progressing in time: note the time lapse between low engine power and achieving near maximum power is two seconds; low engine power (steady state); high speed motor is on and low sped generator is on (steady state); pilot demands more lift from rotor, rotor requires more power (transient is initiated); the rotor begins to droop in speed as does the engine's low speed shaft that it is connected to; engine power is ramped up (the engine control has anticipated this somewhat); the gas generator accelerates; at an optimum time, change the modes of the electrical machines; high speed motor/generator is off and low speed motor/generator is off; next, high speed generator is on and low speed motor is on (the main rotor now is being boosted by extracting power from the gas generator, effectively reducing the gas generator's own rate of acceleration, but this is acceptable at this point in the transient); maintain status for approximately 400 milliseconds; switch back to steady-state situation; high speed motor/generator is off and low speed motor/generator is off; high speed motor is on and low speed generator is on(steady state); ready for next transient.

Figure 3:
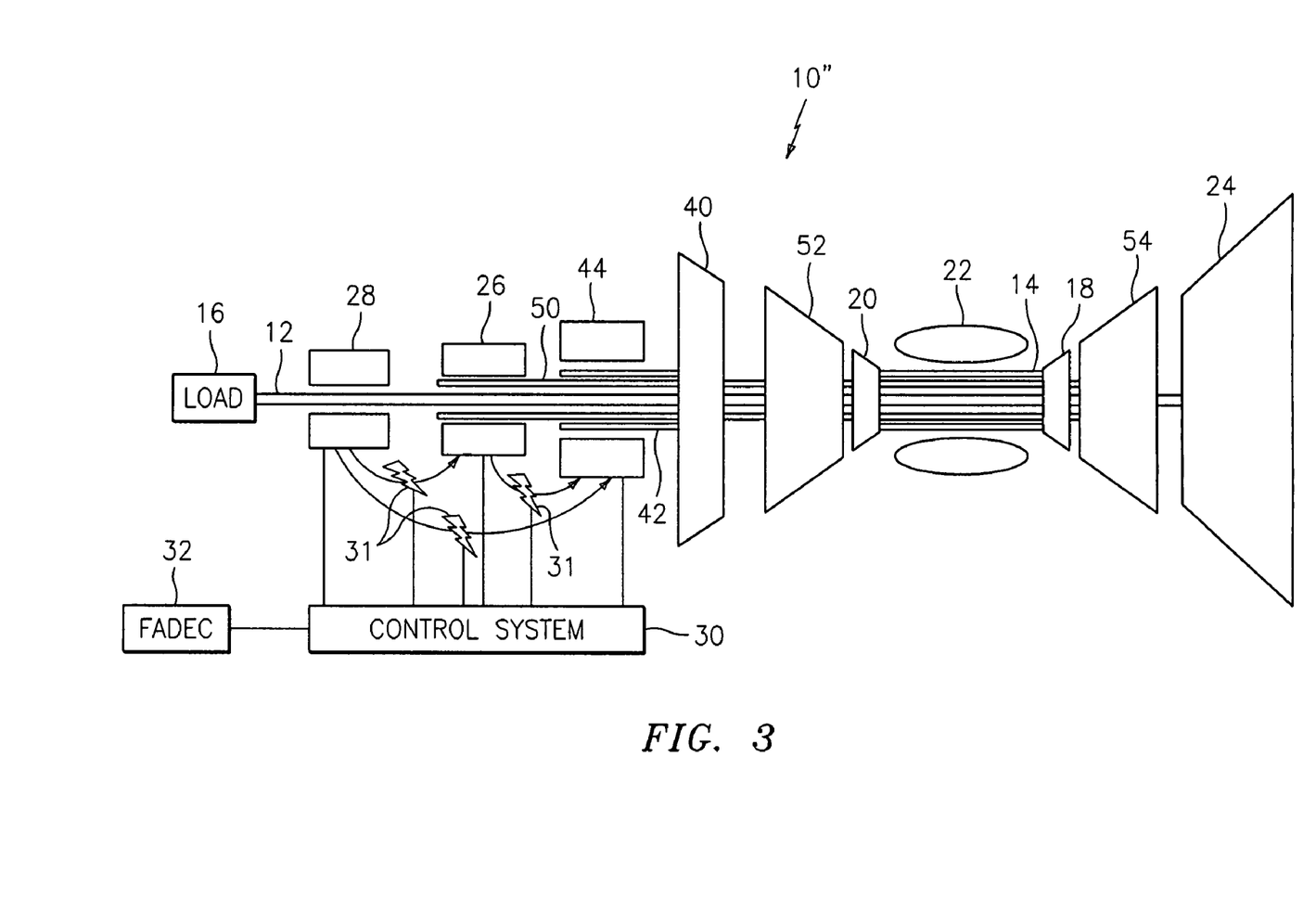
FIG. 3 is a schematic representation of a third embodiment of a gas turbine engine in accordance with the present invention.

While the engine 10 has been shown as having a single spool, it is possible to provide an engine 10" having multiple spools. Such an engine 10" is shown in FIG. 3 where there is an additional spool 50 having an additional compressor 52 and an additional turbine 54 attached to it.

If desired, the electrical machines 26, 28 and 44 may be used to provide aircraft systems with electrical power.

Figure 4:
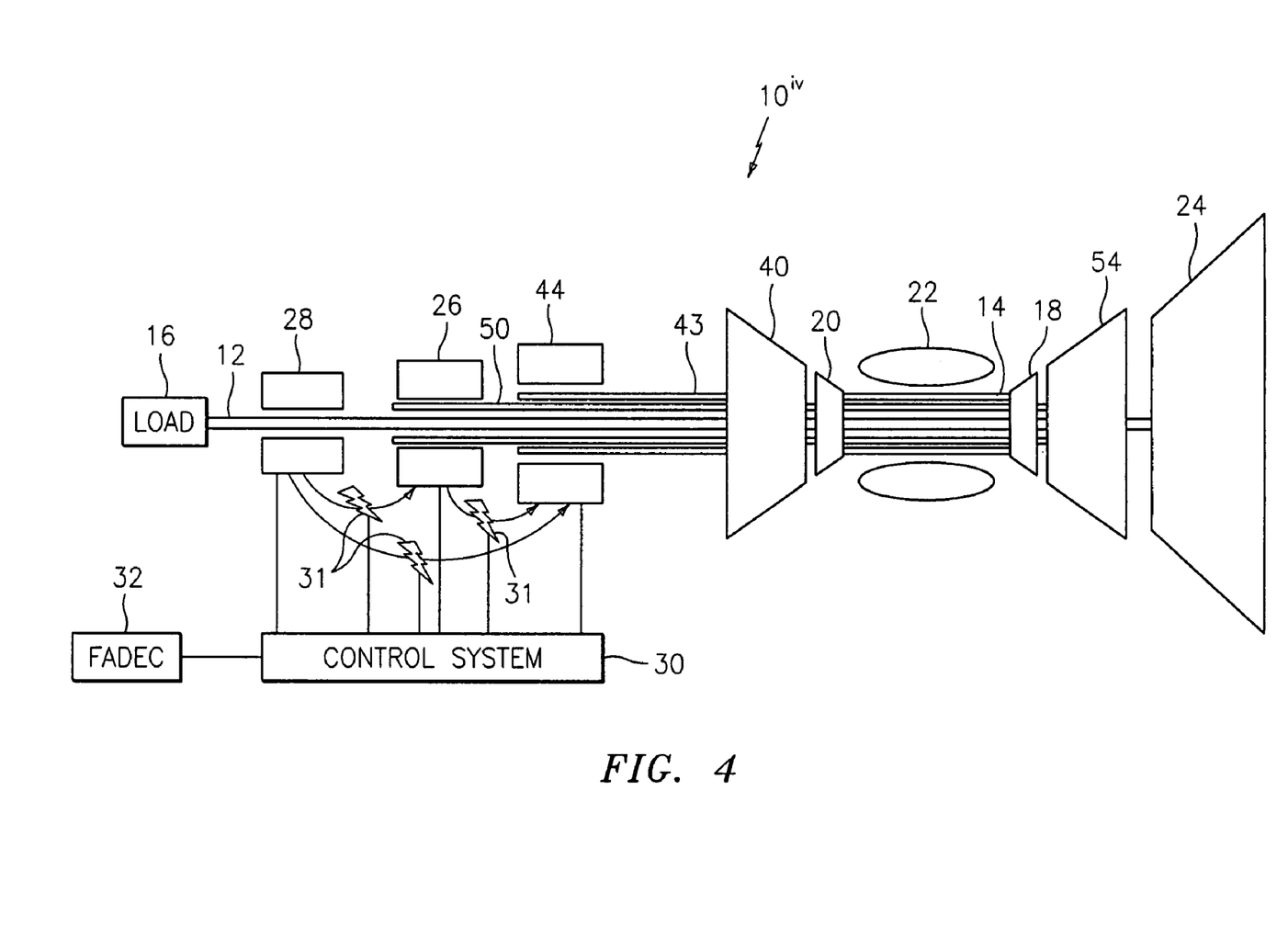
FIG. 4 is a schematic representation of a fourth embodiment of a gas turbine engine in accordance with the present invention.

Referring now to FIG. 4, there is shown still another embodiment of a gas turbine engine $10^{iv}$ in accordance with the present invention. This embodiment is similar to the embodiment shown in FIG. 3 but deletes compressor 52. Shaft 50 connects to turbine 54 and to electrical machine 26 only. There is no connection of shaft 50 to compressor 40. Instead, compressor 40 is connected to a fourth shaft 43. In this embodiment, the shaft connections are as follows, working from the innermost shaft outward and from left to right for each shaft:

Shaft 12: load 16 and electrical machine 28 and turbine 24;
Shaft 50: electrical machine 26 and turbine 54;
Shaft 43: electrical machine 44 and compressor 40; and
Shaft 14: compressor 20 and turbine 18.

Figure 5:
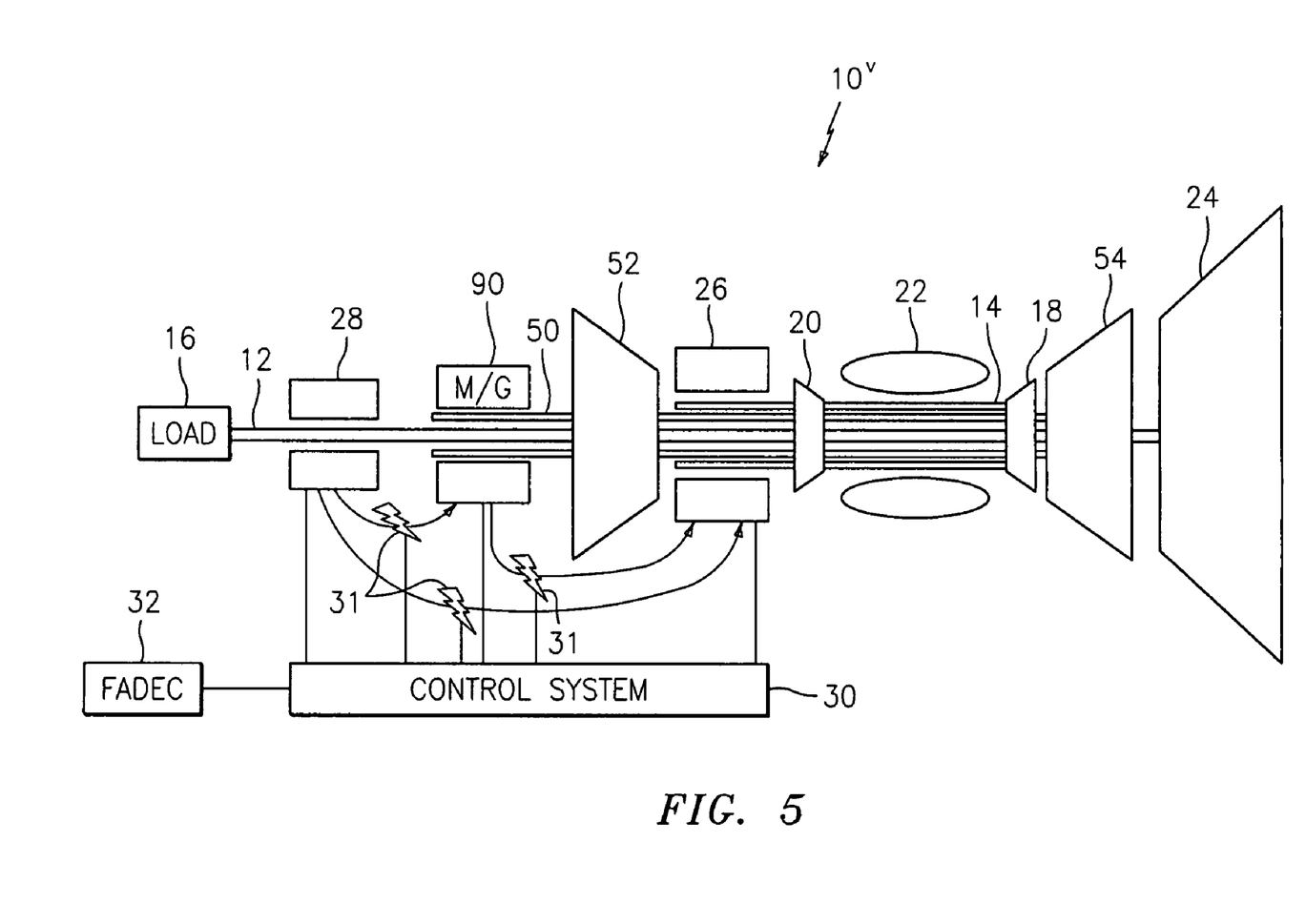
FIG. 5 is a schematic representation of a fifth embodiment of a gas turbine engine in accordance with the present invention.

Referring now to FIG. 5, there is shown yet another embodiment of a gas turbine engine $10^v$ in accordance with the present invention. In this embodiment, there is a first spool on which is located a compressor 20 and a turbine 18. Attached to the spool is an electrical machine 26 which as before can be either a motor or a generator. The engine $10^v$ also has a second spool which includes turbine 54 and compressor 52. This spool is connected to an electrical machine 90 which selectively can operate as a motor or generator. Turbine 24 is used to drive the load 16 via the shaft 12. An electrical machine 28 is connected to the shaft 12. Operation of the various electrical machines can be controlled by a control system 30 which in turn is controlled by a full authority digital electronic control (FADEC) 32. As before, the control system 30 may comprise a computer or processor which is programmed in any suitable manner known in the art to control compressor geometry and to control the various electrical machines. The control system 30 provides instructions to the various electrical machines to operate as a motor or generator depending upon engine requirements. The power electronics 31 between the electrical machines are provided to allow electrical power to be transferred from one electrical machine to another electrical machine and vice versa.

Figure 6:
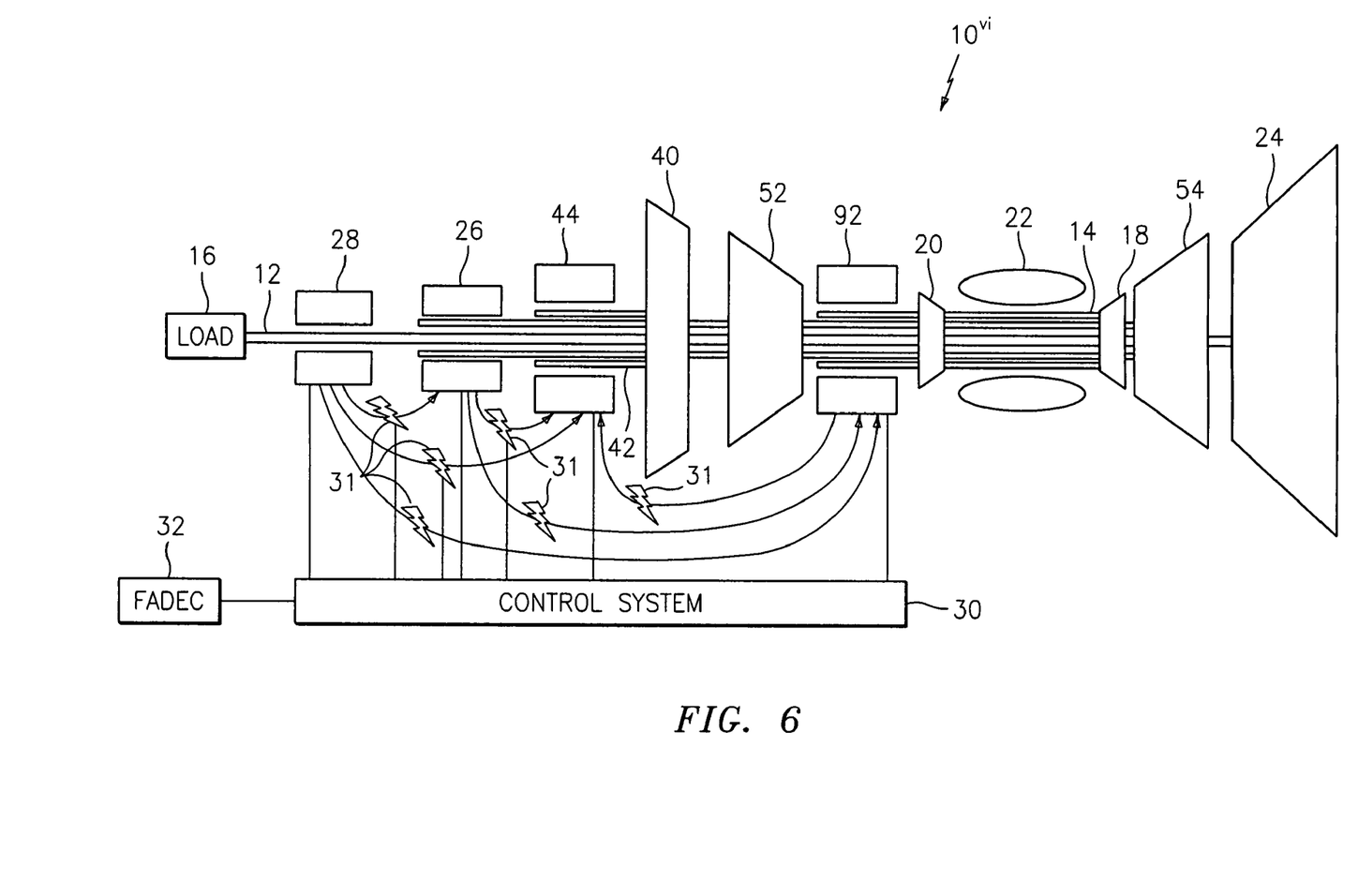
FIG. 6 is a schematic representation of a sixth embodiment of a gas turbine engine in accordance with the present invention.

Referring now to FIG. 6, there is shown still another embodiment of a gas turbine engine $10^{vi}$ in accordance with the present invention. This engine is functionally a composite of the engine shown in FIGS. 2 and 5. The engine $10^{vi}$ includes free compressor 40 which is driven by the motor 44. Also included is a first spool 14 which contains turbine 18 and compressor 20 and which is connected to electrical machine 92. The engine further has a second spool which includes turbine 54 and compressor 52 and which is attached to electrical machine 26. Still further, the engine has a turbine 24 which drives the load 16 via the shaft 12. Connected to the shaft 12 is electrical machine 28. The electrical machines 26, 28, and 92 may be selectively operable as either a motor or a generator depending on engine requirements. A control system 30 is provided to control and operate the electrical machines 26, 28, and 92 as previously discussed. Also provided are power electronics 31 to allow electrical power to flow from one electrical machine to another electrical machine and vice versa. The control system 30 communicates with the FADEC 32.

It is apparent that there has been provided in accordance with the present invention an electrically coupled supercharger for a gas turbine engine which fully satisfies the objects, means, and advantages set forth hereinbefore. While the present invention has been described in the context of specific embodiments thereof, other alternatives, modifications and variations will become apparent to those skilled in the art having read the foregoing description. Accordingly, it is intended to embrace those alternatives, modifications, and variations, as fall within the broad scope of the appended claims.

What is claimed is:

1. A gas turbine engine comprising:
a gas generator spool having a compressor and a first turbine mounted thereto;
a power output shaft and a second turbine mounted to said power output shaft;
said spool and said power output shaft being independently rotatable and rotating at different speeds; and
electrical means for modifying the speed of said spool to achieve a balance between power absorbed by the compressor and power available from the first turbine, said electrical means including a first electrical machine having functionality as one of a motor and a generator mounted to the spool.

2. The gas turbine engine according to claim 1, wherein the electrical means comprises a second electrical machine having functionality as one of a motor and a generator mounted to the power output shaft.

3. The gas turbine engine according to claim 2, further comprising power electronic means for transferring electrical power between said first electrical machine and said second electrical machine to achieve re-matching of said compressor to higher speed and flow rate to increase a surge margin of the compressor.

4. The gas turbine engine according to claim 1, further comprising a load attached to said power output shaft.

5. The gas turbine engine according to claim 4, wherein said load is a helicopter rotor.

6. The gas turbine engine according to claim 1, wherein said power output shaft is operated at a constant speed.

7. The gas turbine engine according to claim 1, wherein said turbine mounted to said power output shaft comprises a free turbine.

8. A gas turbine engine comprising:
a gas generator spool having a compressor and a first turbine mounted thereto;
a power output shaft and a second turbine mounted to said power output shaft;
said spool and said power output shaft being independently rotatable and rotating at different speeds;
electrical means for modifying the speed of said spool to achieve a balance between power absorbed by the compressor and power available from the first turbine,
wherein the electrical means comprises a first electrical machine mounted to the spool and a second electrical machine mounted to the power output shaft, and
wherein said first electrical machine operates as a generator and said second electrical machine operates as a motor.

9. A gas turbine engine comprising:
a gas generator spool having a compressor and a first turbine mounted thereto;
a power output shaft and a second turbine mounted to said power output shaft;
said spool and said power output shaft being independently rotatable and rotating at different speeds;
electrical means for modifying the speed of said spool to achieve a balance between power absorbed by the compressor and power available from the first turbine,
wherein the electrical means comprises a first electrical machine mounted to the spool and a second electrical machine mounted to the power output shaft, and wherein said first electrical machine operates as a motor and said second electrical machine operates as a generator.

10. A gas turbine engine comprising:
a gas generator spool having a compressor and a first turbine mounted thereto;
a power output shaft and a second turbine mounted to said power output shaft;
said spool and said power output shaft being independently rotatable and rotating at different speeds;
electrical means for modifying the speed of said spool to achieve a balance between power absorbed by the compressor and power available from the first turbine,
wherein the electrical means comprises a first electrical machine mounted to the spool and a second electrical machine mounted to the power output shaft,
power electronic means for transferring electrical power between said first electrical machine and said second electrical machine to achieve re-matching of said compressor to higher speed and flow rate to increase a surge margin of the compressor; and
a control system for controlling operation of the first and second electrical machines and a FADEC connected to said control system.

11. A gas turbine engine comprising:
a gas generator spool having a compressor and a first turbine mounted thereto;
a power output shaft and a second turbine mounted to said power output shaft;
said spool and said power output shaft being independently rotatable and rotating at different speeds;
electrical means for modifying the speed of said spool to achieve a balance between power absorbed by the compressor and power available from the first turbine; and
a free compressor for supercharging said compressor on said spool.

12. The gas turbine engine according to claim 11, further comprising a motor for driving said free compressor and said free compressor and said motor being connected to a third shaft.

13. A gas turbine engine comprising:
a spool having a turbine and a compressor mounted thereto;
a first shaft and a free turbine mounted to said first shaft; and
means for transferring power between said spool and said first shaft: and
said power transferring means comprising a first electrical machine attached to said spool, a second electrical machine attached to said first shaft, and means for transmitting electrical power between said first electrical machine and said second electrical machine.

14. The gas turbine engine according to claim 13, further comprising a source of heat positioned between said turbine and said compressor.

15. The gas turbine engine according to claim 14, wherein said source of heat comprises a combustor.

16. The gas turbine engine according to claim 13, further comprising means for controlling the transmission of said electrical power between said first electrical machine and said second electrical machine.

17. The gas turbine engine according to claim 16, further comprising a FADEC connected to said controlling means.

18. The gas turbine engine according to claim 13, wherein said first electrical machine comprises a motor/generator and said second electrical machine comprises a motor/generator.

19. The gas turbine engine according to claim 13, wherein said compressor attached to said spool comprises a variable geometry compressor.

20. The gas turbine engine according to claim 13, further comprising an additional spool having an additional compressor and an additional turbine.

21. The gas turbine engine according to claim 13, wherein said first shaft comprises a power output shaft for driving a load.

22. A gas turbine engine comprising:
a spool having a turbine and a compressor mounted thereto;
a first shaft and a free turbine mounted to said first shaft;
means for transferring power between said spool and said first shaft; and
a free compressor connected to a second shaft.

23. The gas turbine engine according to claim 22, wherein said free compressor is a variable geometry compressor.

24. The gas turbine engine according to claim 22, wherein said second shaft is positioned outside of said spool.

25. The gas turbine engine according to claim 22, wherein said power transferring means comprises a first electrical machine attached to said spool, a second electrical machine attached to said first shaft, a third electrical machine connected to said second shaft, and means for transmitting electrical power between said first electrical machine, said second electrical machine, and said third electrical machine.

26. The gas turbine engine according to claim 25, further comprising means for controlling the transmission of said electrical power between said first, second, and third electrical machines.

27. The gas turbine engine according to claim 26, further comprising a FADEC connected to said controlling means.

28. The gas turbine engine according to claim 25, wherein said first electrical machine comprises a motor/generator, said second electrical machine comprises a motor/generator, and said third electrical machine comprises a motor.

29. A gas turbine engine comprising:
a spool having a turbine and a compressor mounted thereto;
a first shaft and a free turbine mounted to said first shaft;
means for transferring power between said spool and said first shaft; and
said first shaft comprising a power output shaft for driving a load,
wherein said load comprises a helicopter rotor.

30. The A gas turbine engine comprising:
a spool having a turbine and a compressor mounted thereto;
a first shaft and a free turbine mounted to said first shaft;
means for transferring power between said spool and said first shaft; and
a free compressor connected to a second shaft,
wherein each of said compressors is a variable geometry compressor and further comprising means for controlling the geometry of each of said compressors and for controlling said power transferring means.

31. A turboshaft engine for use in an aircraft comprising:
a power output shaft and a power turbine attached to said power output shaft;
a spool surrounding a portion of said power output shaft;
a gas generator compressor and a turbine attached to said spool; and
a free compressor attached to a driven shaft.

32. The turboshaft engine according to claim 31, wherein each of said compressors has a variable geometry.

33. The turboshaft engine according to claim 32, further comprising an electric motor attached to said free compressor.

34. The turboshaft engine according to claim 33, further comprising a motor/generator attached to said spool.

35. The turboshaft engine according to claim 34, further comprising a motor/generator attached to said power output shaft.

36. The turboshaft engine according to claim 35, further comprising means for controlling the variable geometry of said compressors and for controlling said motor and said motor/generators.

37. The turboshaft engine according to claim 36, wherein said controlling means comprises means for transferring electrical power between said motor and said motor/generators.

38. The turboshaft engine according to claim 37, wherein said controlling means further comprises a FADEC connected to said electrical power transferring means.

* * * * *

UNITED STATES PATENT AND TRADEMARK OFFICE
CERTIFICATE OF CORRECTION

| | | |
|---|---|---|
| PATENT NO. | : 7,513,120 B2 | Page 1 of 1 |
| APPLICATION NO. | : 11/101527 | |
| DATED | : April 7, 2009 | |
| INVENTOR(S) | : Daniel B. Kupratis | |

It is certified that error appears in the above-identified patent and that said Letters Patent is hereby corrected as shown below:

In column 12, claim 30, line 1, "The" before A gas should be deleted.

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,513,120 B2 |
| APPLICATION NO. | : 11/101527 |
| DATED | : April 7, 2009 |
| INVENTOR(S) | : Daniel B. Kupratis |

It is certified that error appears in the above-identified patent and that said Letters Patent is hereby corrected as shown below:

In column 12, claim 30, line 45, "The" before A gas should be deleted.

This certificate supersedes the Certificate of Correction issued October 20, 2009.

Signed and Sealed this

Tenth Day of November, 2009

David J. Kappos
*Director of the United States Patent and Trademark Office*